United States Patent
Ho

(10) Patent No.: US 12,399,004 B2
(45) Date of Patent: Aug. 26, 2025

(54) DEVICE AND METHOD FOR LASER ALIGNMENT

(71) Applicant: TECHTRONIC CORDLESS GP, Anderson, SC (US)

(72) Inventor: Man Kit Ho, Hong Kong (CN)

(73) Assignee: Techtronic Cordless GP, Anderson, SC (US)

( * ) Notice: Subject to any disclaimer, the term of this patent is extended or adjusted under 35 U.S.C. 154(b) by 546 days.

(21) Appl. No.: 17/817,924

(22) Filed: Aug. 5, 2022

(65) Prior Publication Data

US 2023/0075363 A1 Mar. 9, 2023

(30) Foreign Application Priority Data

Sep. 9, 2021 (HK) .............................. 32021038647.2

(51) Int. Cl.
*G01C 15/00* (2006.01)
*G01B 11/27* (2006.01)

(52) U.S. Cl.
CPC ............ *G01C 15/004* (2013.01); *G01B 11/27* (2013.01)

(58) Field of Classification Search
CPC ............................... G01C 15/004; G01B 11/27
USPC .......................................... 33/228, 286, 293
See application file for complete search history.

(56) References Cited

U.S. PATENT DOCUMENTS

| 4,333,242 A * | 6/1982 | Genho, Sr. ............ G01B 11/27 33/290 |
| 4,381,150 A * | 4/1983 | Curtis .................... G01B 11/27 356/153 |
| 5,594,993 A | 1/1997 | Tager et al. |
| 5,687,486 A * | 11/1997 | Foltz ..................... G01C 15/06 33/296 |
| 5,754,582 A | 5/1998 | Dong |
| 5,872,657 A | 2/1999 | Rando |
| 5,890,299 A * | 4/1999 | Giordano .............. G06F 1/1684 33/286 |

(Continued)

FOREIGN PATENT DOCUMENTS

| CN | 107525494 A | 12/2017 |
| CN | 108896034 A | 11/2018 |

(Continued)

OTHER PUBLICATIONS

Extended European Search Report for Application No. 22176558.9 dated Nov. 28, 2022 (9 pages).

(Continued)

*Primary Examiner* — George B Bennett
(74) *Attorney, Agent, or Firm* — Michael Best & Friedrich LLP

(57) ABSTRACT

There is provided a laser alignment device (10) for use between a laser device (5) and a planar surface of an object e.g. wall (20) at which a laser beam (30) is to aim at right angles. The laser alignment device (10) includes a back member (12) for use against or parallel to the wall surface, which includes a back indicia (22). Also included is a front member (14) having a front indicia (16) on an imaginary plane shared with the back indicia (22) and perpendicular to the back member (12). The front indicia (16) is positioned for access by the laser beam (30) to reach the back indicia (22) when the laser beam (30) is aligned to aim at the wall surface at right angles.

23 Claims, 4 Drawing Sheets

(56) References Cited

U.S. PATENT DOCUMENTS

| | | |
|---|---|---|
| 6,005,719 A | 12/1999 | Rando |
| 6,199,287 B1 * | 3/2001 | Rankila ............... B60Q 1/48 |
| | | 116/28 R |
| 6,732,439 B1 * | 5/2004 | Radke ................ G01C 15/00 |
| | | 33/286 |
| 6,763,597 B2 * | 7/2004 | Lysen ................ G01B 11/272 |
| | | 33/286 |
| 6,807,740 B2 * | 10/2004 | Reed ................ G01C 15/006 |
| | | 33/286 |
| 6,941,665 B1 | 9/2005 | Budrow et al. |
| 7,174,648 B2 | 2/2007 | Long et al. |
| 7,181,854 B2 | 2/2007 | Long et al. |
| 7,191,532 B2 | 3/2007 | Long et al. |
| 7,197,830 B2 * | 4/2007 | Vaccaro ............... G01N 23/18 |
| | | 378/207 |
| 7,260,895 B2 | 8/2007 | Long et al. |
| 7,322,116 B2 | 1/2008 | Long et al. |
| 7,562,809 B2 * | 7/2009 | Chua ................... H05K 1/14 |
| | | 356/399 |
| 7,675,612 B2 | 3/2010 | Kallabis |
| 8,037,615 B2 * | 10/2011 | Glaser ................ G01B 11/272 |
| | | 33/529 |
| 8,925,211 B2 | 1/2015 | Dufour |
| 9,228,837 B2 * | 1/2016 | Dumoulin ............. G01J 1/44 |
| 9,291,454 B2 * | 3/2016 | Rothbucher ......... G01C 15/06 |
| 9,518,823 B2 | 12/2016 | Hill |
| 9,846,034 B2 | 12/2017 | Hill |
| 9,863,768 B2 | 1/2018 | Hill |
| 10,317,184 B1 | 6/2019 | Keller |
| 10,538,927 B1 | 1/2020 | Keller |
| 11,022,772 B2 * | 6/2021 | De Vido ............ G01B 11/27 |
| 11,125,557 B1 * | 9/2021 | Riley ................ G01C 15/008 |
| 11,512,954 B2 * | 11/2022 | Loebig ................ G01C 9/08 |
| 11,796,317 B1 * | 10/2023 | Ballew ................ G01C 15/06 |
| 2004/0261278 A1 | 12/2004 | Bodgren et al. |
| 2007/0220762 A1 | 9/2007 | Clauss et al. |
| 2008/0052927 A1 | 3/2008 | Parel et al. |
| 2008/0052928 A1 | 3/2008 | Parel et al. |
| 2019/0353469 A1 | 11/2019 | Keller |
| 2020/0018917 A1 | 1/2020 | De Vido |
| 2024/0310166 A1 * | 9/2024 | Goffredo ............ G01B 11/27 |

FOREIGN PATENT DOCUMENTS

| | | |
|---|---|---|
| EP | 1916500 B1 | 12/2010 |
| JP | H09308565 A | 12/1997 |
| WO | 2009024381 A1 | 2/2009 |
| WO | 2009024382 A1 | 2/2009 |
| WO | 2009024383 A1 | 2/2009 |
| WO | 2009024384 A1 | 2/2009 |
| WO | 2009053308 A1 | 4/2009 |
| WO | 2020210484 A1 | 10/2020 |

OTHER PUBLICATIONS

European Patent Office Action for Application No. 22176558.9 dated Mar. 12, 2024 (7 pages).

Spot-On Sundials, "The New Royal Horticultural Society Bicentenary Sundial," <https://web.archive.org/web/20191229162305/http://www.spot-on-sundials.co.uk/rhs.html> web page visited Mar. 5, 2024 (1 page).

Wissner, "WISSNER® Active Learning Board Drawing Tools Small Geometry Angle," <https://www.amazon.com/WISSNER-Active-Learning-Drawing-Geometry/dp/B06W2MR43X> web page visited Mar. 5, 2024 (4 pages).

* cited by examiner

DEVICE AND METHOD FOR LASER ALIGNMENT

TECHNICAL FIELD

The present invention relates to a device and a method for laser alignment. In particular, the present invention relates to a laser alignment device for use between a laser device and a planar surface of an object to adjust a laser beam to aim at right angles to the planar surface, and a relevant aligning method using the laser alignment device.

BACKGROUND

Laser devices generate at least one laser beam onto a surface of an object. The laser beam may include vertical and/or horizontal laser lines projected onto the surface of the object. Such laser devices can be used in construction, installation, alignment, measurement or referencing at various sites, for example, from construction site to home. For some laser devices, graduation marks or other scale indications can be provided in vertical and/or horizontal laser lines.

In order to use such scale indications, a user should assume that a laser beam emitted from the laser device is perpendicular to the surface of an object e.g. a wall. For example, FIG. 1a shows a laser device 5 and a wall 20 onto which a laser beam 30 from the laser device 5 is projected. FIG. 1b shows laser line projection on the object 20 when the laser line includes scale indications. With reference to FIGS. 1a and 1b, if the laser device 5 is not placed properly so a cross laser beam 30 is not projected perpendicularly to the object (i.e., wall 20), scale indications in the laser line projection will not be correct. For example, distance "a" and distance "b" will be different if the laser device 5 is not placed to project the cross laser beam 30 perpendicularly to the wall 20, as shown in FIG. 1b.

In the light of the foregoing, there is a need to provide a device and a method for aligning the cross laser beam to be perpendicular to a planar surface of an object at which the laser beam is projected.

SUMMARY OF THE INVENTION

According to an aspect of the present invention, there is provided a laser alignment device for use between a laser device and a planar surface of an object at which a laser beam is to aim at right angles. The laser alignment device includes a back member for use against or parallel to the planar surface, the back member including a back indicia, and a front member including a front indicia on an imaginary plane shared with the back indicia and perpendicular to the back member, the front indicia being positioned for access by the laser beam to reach the back indicia when the laser beam is aligned to aim at the planar surface at right angles.

In some embodiments, the back member may include a back plate.

In some embodiments, the front indicia may include a gap or slot.

In some embodiments, the front member may include a front plate in which the gap or slot is formed.

In some embodiments, the front member may include two parts separated apart by the gap or slot.

In some embodiments, the gap or slot extends right across upper and lower sides of the front member.

In some embodiments, the front indicia may be positioned for passing by the laser beam to reach the back indicia when the laser beam is aligned to aim at the planar surface at right angles.

In some embodiments, the front member and the back member may be connected together in a spaced apart relationship by a connecting member.

In some embodiments, the front member and the back member may be connected together in a spaced apart relationship by two said connecting members on opposite sides of the imaginary plane.

In some embodiments, the front member and the two connecting members may be connected to form a rectangular U-shaped structure.

In some embodiments, the front member, the back member and the two connecting members may be connected to form a rectangular looped structure.

In some embodiments, the front member may have a 3-dimensional body with a depth (D) to allow the front indicia to be positioned in front of the back indicia.

In some embodiments, the body may have one of the shapes comprising cubical, cuboidal, wedge-shape, part-cylindrical and part-spherical.

In some embodiments, a height (H) of the body may be smaller than a height of the back member.

In some embodiments, the front indicia may include a line on the front member along the imaginary plane that extends in a vertical direction.

In some embodiments, the front indicia and the back indicia may include a color which is lighter than a background color of the front member and the back member.

In some embodiments, the front indicia and the back indicia may be reflective.

In some embodiments, the back indicia may include a vertical line positioned on the back member.

In some embodiments, the imaginary plane may extend in a vertical direction.

In some embodiments, the laser beam may be determined to aim at right angles to the planar surface when the laser beam, the front indicia and the back indicia are aligned along the imaginary plane.

According to another aspect of the present invention, there is provided a method of aligning a laser beam emitted from a laser device. The method includes providing the aforesaid laser alignment device, placing the laser alignment device between the laser device and a planar surface of an object at which the laser beam is to aim at right angles, positioning the laser alignment device such that its back member extends parallel to the planar surface of the object, projecting the laser beam past the front indicia and further reach onto the back member that includes the back indicia, and determining if the laser beam is aligned with the back indicia, thereby confirming aiming of the laser beam at right angles to the planar surface of the object.

In some embodiments, the determining step may include manipulating the laser device to adjust the angle of projection of the laser beam until the laser beam is aligned with the back indicia.

In some embodiments, the determining step may include determining if the laser beam, the front indicia and the back indicia are aligned along the imaginary plane.

Other features and aspects of the invention will become apparent by consideration of the following detailed description, drawings and claims.

Before any independent constructions of the invention are explained in detail, it is to be understood that the invention is not limited in its application to the details of construction and the arrangement of components set forth in the following description or illustrated in the following drawings. The invention is capable of other independent constructions and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

BRIEF DESCRIPTION OF DRAWINGS

These and other features of the invention will become more apparent from the following description, by way of example only, with reference to the accompanying drawings, in which.

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Hereinafter, embodiments of the present disclosure will be described in detail with reference to the drawings.

Figure 1A:
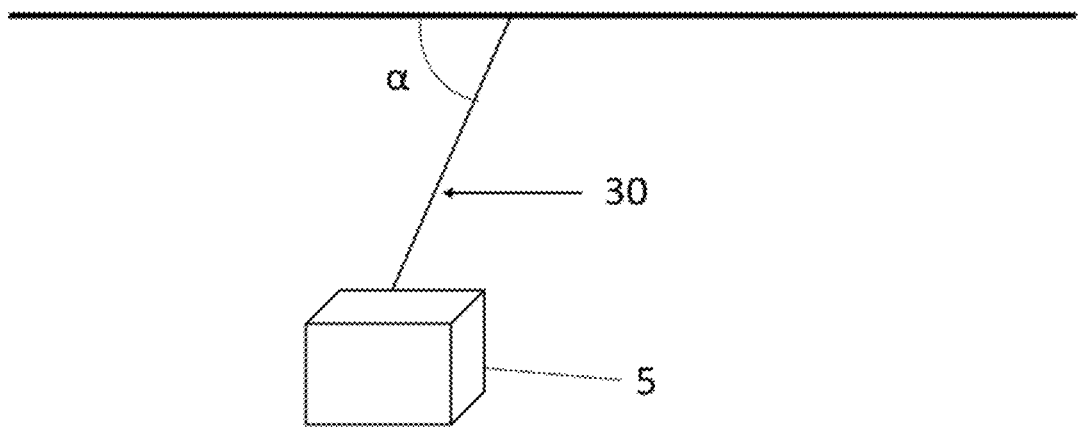
FIG. 1a is a schematic diagram showing a laser device and an object, e.g. wall, onto which a laser beam from the laser device is projected, producing a laser line projection on the wall.
Figure 1B:
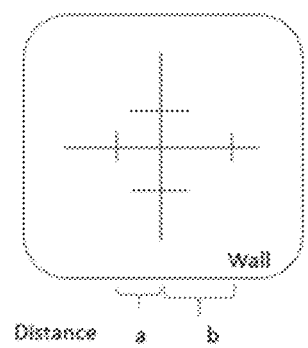
FIG. 1b is a schematic diagram showing the laser line projection on the wall.
Figure 2:
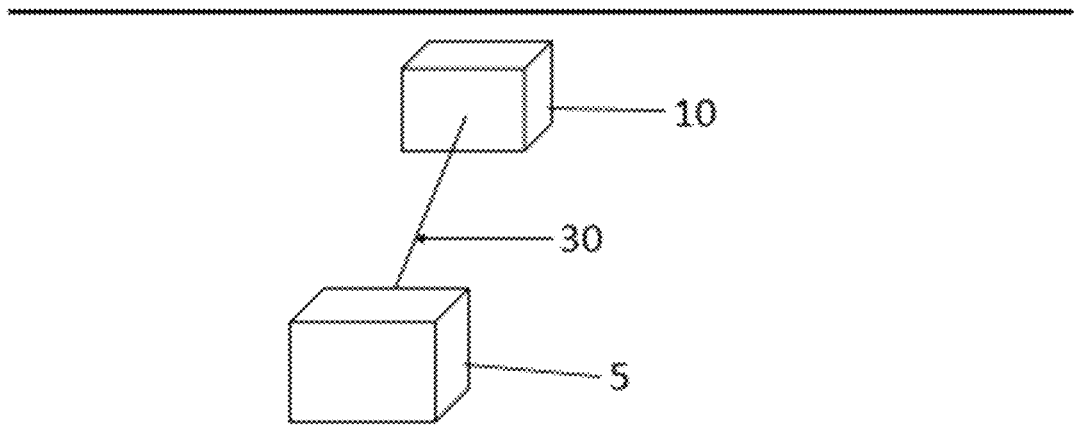
FIG. 2 is a schematic diagram showing a laser device, a wall and a laser alignment device in use according to the invention.

With reference to FIG. 2, a laser alignment device 10 embodying the invention is positioned and used between a laser device 5 and a planar surface of an object 20, which is typically a wall. The laser device 5 is designed to generate and emit at least one laser beam 30, which is typically in the form of a fan beam that produces a respective laser line on the surface of the object 20. For example, a horizontal laser line and a vertical laser line, together forming a cross laser beam, can be projected onto the surface of the object 20. The laser device 5 may project the horizontal and the vertical laser lines with graduation marks or other scale indications.

Figure 3:
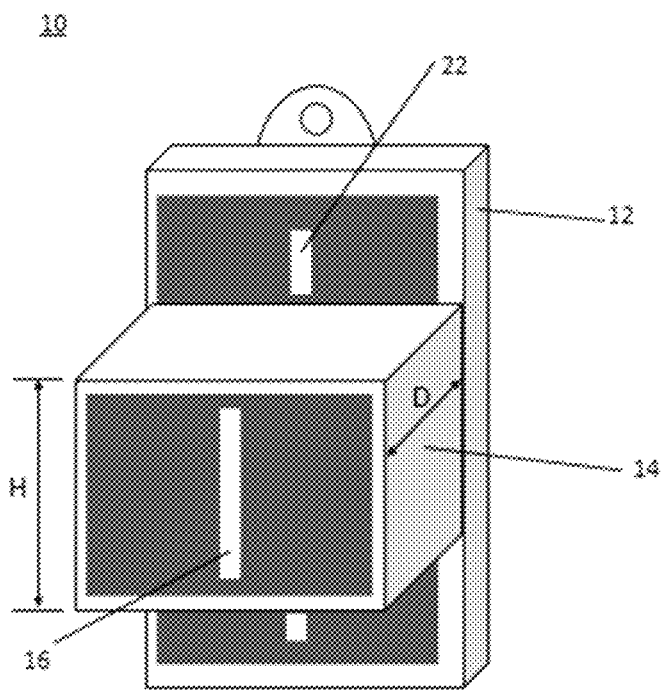
FIG. 3 is a perspective view of a laser alignment device in accordance with a first embodiment of the invention.
Figure 4:
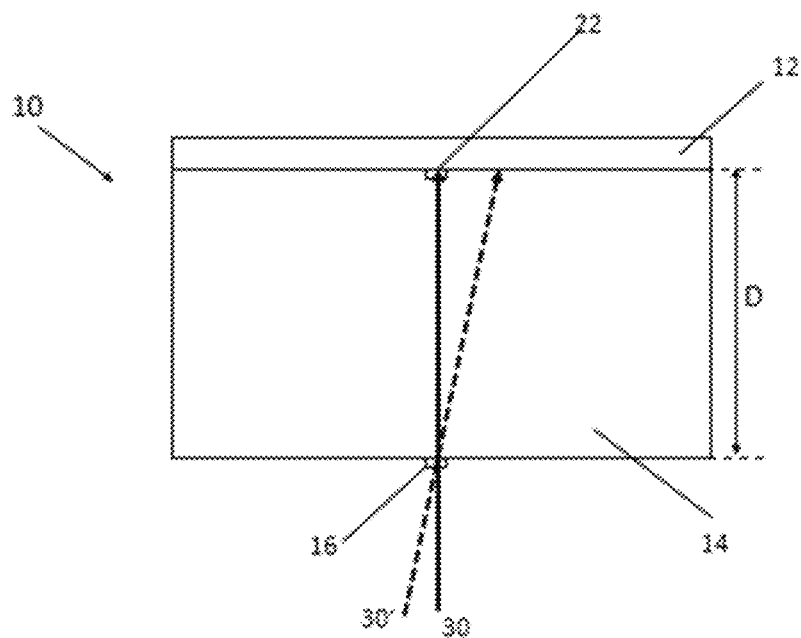
FIG. 4 is a top plan view of the laser alignment device of FIG. 3 in use, showing a laser beam projected therethrough.

FIG. 3 is a perspective view of the laser alignment device 10 according to a first embodiment of the invention. FIG. 4 is a plan view of the laser alignment device 10 when viewed from above and used according to a method in accordance with the invention.

With reference to FIGS. 3 and 4, the laser alignment device 10 includes a back member 12 for use against or parallel to a planar surface of an object (for example, a wall). The back member 12 may be or comprises a back plate 12 that is designed to extend in a vertical position during use of the laser alignment device 10. The back plate 12 includes a back indicia 22. The back indicia 22 may be or comprises any type of visual indication element, such as a mark, a color, or a dent, outstanding long as it is visually distinguishable. In a preferred embodiment, the back indicia 22 is provided by a vertical line 22 which is printed, engraved or otherwise molded on the front surface of the back plate 12 along a vertical central axis of the back plate 12. In a preferred embodiment, the back indicia 22 is provided in a lighter color in comparison with the background color of the back plate 12. Alternatively, the back indicia 22 can be reflective. The background color of the back plate 12 can be a darker color so that a user can visually distinguish between the back indicia 22 and the background of the back plate 12. This line 22 acts as a reference and is hereinafter referred to as reference line 22.

The laser alignment device 10 further includes a front member 14 fixed in front of the back plate 12. The front member 14 is located relatively closer to the laser device 5 than the back plate 12, so that the laser beam 30 can access or pass by the front member 14 first. The front member 14 includes a front indicia 16 on an imaginary plane shared with the reference line 22 and perpendicular to the back plate 12. The laser beam 30 can access or reach both the front indicia 16 and the reference line 22, when the laser beam 30 is aligned to aim at the planar surface of the said object/wall 20 at right angles.

In one embodiment, the front member 14 can have a 3-dimensional body with a height (H) and a depth (D). The height (H) of the front member 14 is shorter than a height of the back plate 12 so that the front indicia 16 and the back indicia 22 can both be visible by or exposed to a user and/or be reached by the laser beam. The depth (D) of the front member 14 allows the front indicia 16 to be positioned in front of the back indicia 22 so that the laser beam 30 can reach or pass by the front indicia 16 first. The depth (D) determines a distance from the front indicia 16 to the back indicia 22. The depth (D) can be determined by engineers together with a width of the front and back indices according to application designs, properties of laser beams, space planning and/or marginal values, etc. The body 14 can be made in one of the shapes including cubical, cuboidal, wedge-shape, part-cylindrical and part-spherical (for example, hemi-spherical). Although FIG. 3 shows a cuboidal body 14 for illustration, a skilled person in the art would understand that any 3-dimensional shape of the front member 14 can be provided as long as it allows the front indicia 16 to be positioned in front of the back indicia 22.

In one embodiment, the front indicia 16 may be or comprises any type of visual indication element, such as a mark, a color, or a dent. In a preferred embodiment, the front indicia 16 is provided by a line 16 which is printed, engraved or otherwise molded on the front side of the front member 12 along a vertical central axis of the front member 14. In a preferred embodiment, the front indicia 16 can be provided in a lighter color in comparison with the background color of the front member 14. Alternatively, the front indicia 16 can be reflective. The front indicia 16 and the back indicia 22 can be provided in the same kind of visual indication. The front indicia 16 may be or comprises a line on the front member 14 along the imaginary plane that extends in a vertical direction.

With further reference to FIG. 4, the laser beam 30 is projected onto the laser alignment device 10 before reaching the planar surface of the wall 20. If the laser beam 30 is projected to the front indicia 16 of the front member 14 and also reaches the back plate 12 and coincides with the reference line 22 (i.e. back indicia), the laser beam 30 is determined to aim at right angles to the planar surface of the wall 20. On the other hand, if the laser beam 30 is aimed at an incorrect angle, for example as represented by a dashed line 30' in FIG. 4, then it will only reach one of the front indicia 16 or the back indicia 22, or none of them. This is an indication that the laser beam 30' is not aimed at right angles to the planar surface of the wall 20.

Figure 5:
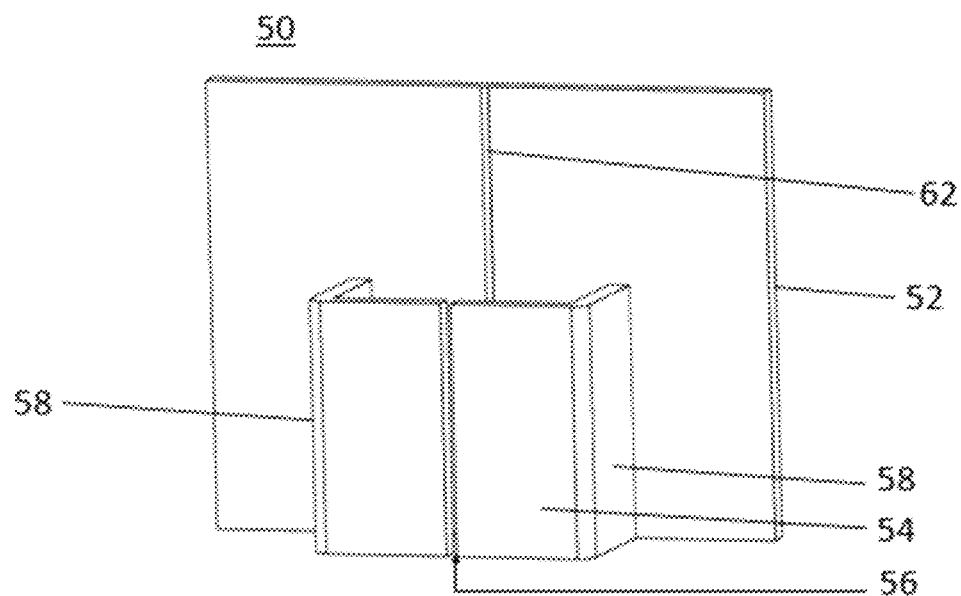
FIG. 5 is a perspective view of a laser alignment device in accordance with a second embodiment of the invention.
Figure 6:
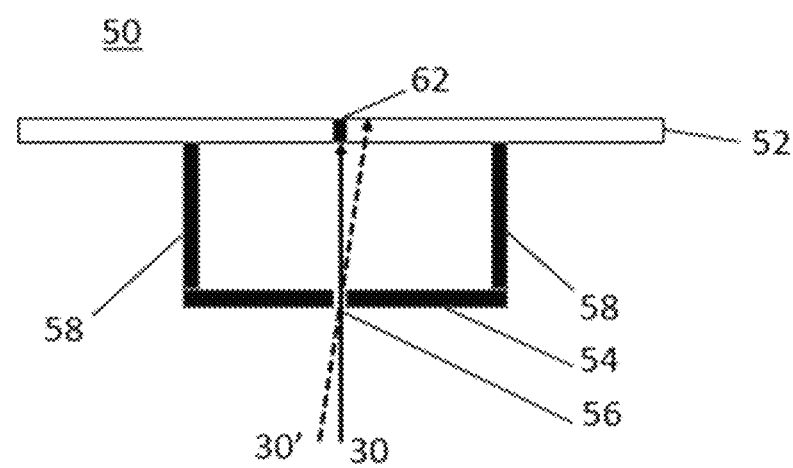
FIG. 6 is a top plan view of the laser alignment device of FIG. 5 in use, showing a laser beam projected therethrough.

FIG. 5 is a perspective view of a laser alignment device 50 according to a second embodiment of the invention. FIG. 6 is a plan view of the laser alignment device 50 when viewed from above and used according to the method in accordance with the invention.

With reference to FIGS. 5 and 6, the front indicia 56 preferably takes the form of a gap, and more preferably a relatively narrow vertical slot, as in the described embodiment. Be it a gap or slot, this front indicia 56 forms an image that resembles a line, albeit transparent or see-through, corresponding to that of the front indicia 16 of the first embodiment, discernible from the background of viewing. The front member 54 is preferably provided by a front plate 54 that extends parallel to the back plate 52. The front indicia 56, i.e. gap or slot 56, is preferably formed at or in, or generally carried by, the front plate 54.

The front plate 54 and the back plate 52 is connected together in a spaced-apart relationship by at least one connecting member 58. In the described embodiment, there are two such connecting members 58, which preferably are planar and rectangular in shape and are provided on opposite sides of the imaginary plane (or the front indicia 56). As shown in FIGS. 5 and 6, the front plate 54 and the two connecting members 58 are connected together to form a rectangular U-shaped structure (when viewed from above or below). More specifically, the front plate 54, the back plate 52 and the two connecting members 58 are connected together to form a rectangular looped structure.

In the described embodiment, the laser alignment device 50 has an integral or integrally formed one-piece construction, without any loose or moving parts. With this construction, the laser alignment device 50 is convenient to use and requires little maintenance.

The front indicia or slot 56 extend right across the upper and lower sides of the front plate 54. In other words, the front plate 54 comprises two parts that is separated apart by the slot 56. This configuration is particularly advantageous as it allows the vertical fan beam 30 of the laser device 5 to cut through the slot 56 without obstruction, such that an unbroken bright line can be projected onto the back plate 52 behind the front plate 54 for ease of viewing.

With further reference to FIG. 6, the laser beam 30 is projected onto the laser alignment device 50 before reaching the planar surface of the wall 20. If the laser beam 30 is projected to extend through and past the front slot 56 (i.e. front indicia) of the front plate 54 and reach the back plate 52 and coincide with the reference line 62 (i.e. back indicia), the laser beam 30 is determined to aim at right angles to the planar surface of the wall 20. Whether or not the laser beam 30 coincides with the reference line 62 is determined by observing and aligning a bright line it forms on the back plate 52 with the reference line 62. Accordingly, alignment of the laser beam 30 through the front slot 56 with the reference line 62 on the back along the aforesaid imaginary plane, the laser beam 30 is determined to aim at right angles to the planar surface of the wall 20. On the other hand, if the laser beam 30 is aimed at an incorrect angle, for example as represented by a dashed line 30' in FIG. 6, then it will not coincide with the reference line 62. This is an indication that the laser beam 30' is not aimed at right angles to the planar surface of the wall 20.

The aforesaid imaginary plane is predetermined, by reason of the geometrical configuration of the laser alignment device 50, to be a plane which extends perpendicular to the back plate 52 (and hence also to the planar surface of the object 20 during measurement) and on and along which the front slot 56 and the reference line 62 on the back both lie and hence share.

The laser alignment device according to the described embodiments may be stand-type which can stand on the ground between a laser device 5 and a planar surface of an object 20 (for example, a wall). Alternatively, the laser alignment device can be hung against the planar surface of the object/wall 20.

According to another aspect of the invention, there is provided a method of aligning a laser beam emitted from a laser device by using the laser alignment device 10, 50 described as above with reference to FIGS. 3 to 6. The provision of the laser alignment device 10, 50, whose construction is per the general and/or specific construction as described above, may be considered as part of the method. In operation, the laser alignment device 10, 50 is placed in a stable position between the laser device 5 and a planar surface of an object, e.g. the wall 20, at which a laser beam from the laser alignment device 10, 50 is intended to be aimed at right angles. Initially, the laser alignment device 10, 50 should be oriented such that its back plate 12, 52 extends parallel to the wall 20, with the laser device 5 projecting a laser beam 30/30' onto the front indicia 16, 56 and further onto the back plate 12, 52. Being a fan beam, the laser beam 30/30' shines a vertical bright line on the back place 12, 52, which initially would be offset from or with respect to the reference line 22, 62. The laser device 5 is manipulated and in particular adjusted in position linearly and/or angularly as between left and right sides or directions, until the bright line is aligned or coincides with the reference line 22, 62.

According to the method, a laser beam 30 is projected through the front slot 16 (i.e. front indicia) of the front plate 14 at the reference line 22 (i.e. back indicia) on the back plate 12, or projected onto the front indicia 56 of the front member 54 and further onto the back indicia 62 of the back plate 52. If the laser beam 30 forms a bright line that reaches and coincides with the reference line 22, it is determined that the laser beam 30 is aiming at right angles to the surface of the wall 20. In this condition, the laser beam 30, the front indicia 16, 56 and the reference line 22, 62 are aligned along, hence sharing, an imaginary plane perpendicular to the wall 20. Conversely, if the laser beam, designated by 30', misses the reference line 22, 62, it is not aimed at right angles to the wall 20. It is then necessary to adjust the linear and/or angular position of the laser device 5 until the laser beam, designated by 30, is aligned with the reference line 22, 62, when the bright line formed by the former coincides with the latter.

According to the present invention, a user can easily observe and determine if a laser beam is projected to the surface of a target object, e.g. a wall, at right angles thereto by using the laser alignment device 10, 50. It is more beneficial when the laser lines projected on the object include graduation marks and/or scale indications as they will appear regular, i.e. at equal distance apart, when the laser beam is aimed at right angles as desired at the wall.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided or separately or in any suitable sub-combination.

The invention claimed is:

1. A laser alignment device for use between a laser device and a planar surface of an object at which a laser beam is to aim at right angles, comprising:
    a back member for use against or parallel to the planar surface, the back member including a back indicia; and
    a front member including a front indicia on an imaginary plane shared with the back indicia and perpendicular to the back member, the front indicia being positioned for access by the laser beam to reach the back indicia when the laser beam is aligned to aim at the planar surface at right angles.

2. The laser alignment device of claim 1, wherein the back member comprises a back plate.

3. The laser alignment device of claim 1, wherein the front indicia comprises a gap or a slot.

4. The laser alignment device of claim 3, wherein the front member comprises a front plate in which the gap or the slot is formed.

5. The laser alignment device of claim 3, wherein the front member comprises two parts separated apart by the gap or the slot.

6. The laser alignment device of claim 5, wherein the gap or the slot extends right across upper and lower sides of the front member.

7. The laser alignment device of claim 6, wherein the front indicia is positioned for passing by the laser beam to reach the back indicia when the laser beam is aligned to aim at the planar surface at right angles.

8. The laser alignment device of claim 1, wherein the front member and the back member are connected together in a spaced apart relationship by a connecting member.

9. The laser alignment device of claim 8, wherein the connecting member is a first connecting member and wherein the front member and the back member are connected together in a spaced apart relationship by the first connecting member and a second connecting member disposed on opposite sides of the imaginary plane.

10. The laser alignment device of claim 9, wherein the front member and the first and second connecting members are connected to form a rectangular U-shaped structure.

11. The laser alignment device of claim 9, wherein the front member, the back member, and the first and second connecting members are connected to form a rectangular looped structure.

12. The laser alignment device of claim 1, wherein the front member has a 3-dimensional body with a depth (D) to allow the front indicia to be positioned in front of the back indicia.

13. The laser alignment device of claim 12, wherein the body has one of the shapes comprising cubical, cuboidal, wedge-shape, part-cylindrical and part-spherical.

14. The laser alignment device of claim 12, wherein a height (H) of the body is smaller than a height of the back member.

15. The laser alignment device of claim 1, wherein the front indicia comprises a line on the front member along the imaginary plane that extends in a vertical direction.

16. The laser alignment device of claim 1, wherein the front indicia and the back indicia comprise a color which is lighter than a background color of the front member and the back member.

17. The laser alignment device of claim 1, wherein the front indicia and the back indicia are reflective.

18. The laser alignment device of claim 1, wherein the back indicia comprises a vertical line positioned on the back member.

19. The laser alignment device of claim 1, wherein the imaginary plane extends in a vertical direction.

20. The laser alignment device of claim 1, wherein the laser beam is determined to aim at right angles to the planar surface when the laser beam, the front indicia, and the back indicia are aligned along the imaginary plane.

21. A method of aligning a laser beam emitted from a laser device, the method comprising:
    A. providing the laser alignment device of claim 1;
    B. placing the laser alignment device between the laser device and a planar surface of an object at which the laser beam is to aim at right angles;
    C. positioning the laser alignment device such that its back member extends parallel to the planar surface of the object;
    D. projecting the laser beam past the front indicia and further reach onto the back member that includes the back indicia; and
    E. determining if the laser beam is aligned with the back indicia, thereby confirming aiming of the laser beam at right angles to the planar surface of the object.

22. The method of claim 21, wherein step E includes manipulating the laser device to adjust the angle of projection of the laser beam until the laser beam is aligned with the back indicia.

23. The method of claim 21, wherein step E includes determining if the laser beam, the front indicia, and the back indicia are aligned along the imaginary plane.

* * * * *